United States Patent [19]
Kaiser et al.

[11] Patent Number: 5,058,625
[45] Date of Patent: Oct. 22, 1991

[54] VALVE FOR INTERMITTENT INTRODUCTION OF FUEL

[75] Inventors: Klaus Kaiser, Markgroeningen; Hans Kubach, Hemmingen, both of Fed. Rep. of Germany

[73] Assignee: Robert Bosch GmbH, Stuttgart, Fed. Rep. of Germany

[21] Appl. No.: 478,387

[22] Filed: Feb. 12, 1990

[30] Foreign Application Priority Data

Feb. 15, 1989 [DE] Fed. Rep. of Germany ....... 3904480

[51] Int. Cl.$^5$ .................. F16K 31/04; F16K 5/10; F02M 51/08
[52] U.S. Cl. ................ 137/624.15; 137/625.32; 251/129.05; 251/129.11; 123/527
[58] Field of Search .............. 251/129.12, 129.05, 251/129.11, 129.13; 137/625.41, 625.32, 625.47, 624.15; 123/451, 527

[56] References Cited

U.S. PATENT DOCUMENTS 751,888  2/1904  Wilkinson .............. 251/129.13 X
4,285,366  8/1981  Elser ..................... 137/625.32 X Primary Examiner—Arnold Rosenthal
Attorney, Agent, or Firm—Edwin E. Greigg; Ronald E. Greigg

[57] ABSTRACT

A valve for the intermittent introduction of fuel, in particular gaseous fuel, into an intake tube of an internal combustion engine, which is provided with an electrically actuatable valve member disposed in a valve housing. The valve comprises a slide valve having a substantially cosine-like metering motion, and a metering conduit that opens only after a predetermined portion of the metering motion beyond a position of repose of the valve member is provided. As a result, the control edges are overtaken very fast, and a steep rise or drop in the insufflated fuel quantity takes place. A good approximation to the ideal course, which is equivalent to the course of the aspirated air quantity, is therefore achieved.

25 Claims, 5 Drawing Sheets

VALVE FOR INTERMITTENT INTRODUCTION OF FUEL

BACKGROUND OF THE INVENTION

The invention relates to a valve for the intermittent introduction of fuel, in particular gaseous fuel, into an intake tube of an internal combustion engine.

When not only gaseous fuel such as hydrogen, but liquid fuel as well, is blown in, or insufflated, intermittently, if optimal combustion is to be attained, the course of the insufflated quantity $S \cdot Q_k dt$ and the time $\cdot Q_k$ should be a similar course at full rpm to the inflow of the air quantity $\cdot A_L$ into the engine cylinder as shown in FIG. 1, in which curve V represents full-load operation, and curve T, in dashed lines, represents partial-load operation.

In current widely used injection systems (such as the L-Jetronic with intermittent injection), in every operating mode the valves are switched over between two fixed stops. In the open position of the valves, $\cdot Q$ is constant. During idling, the opening time must in each case be very short, so that despite small full-load cross sections, it is difficult to determine small quantities precisely. These conditions are shown in FIG. 2 for full-load and partial-load operation. It has already been proposed that with liquid fuels as well, the upper stop in a ballistic valve seat be omitted. The result then is a quantity characteristic as shown in FIG. 3. With a smaller injected quantity, $\cdot Q_k$ and to a slight extent t are smaller; this is attained by correspondingly shortening the time during which voltage is applied. In the known injection systems that have been reduced to practice, however, only the time is varied, so that dynamic disadvantages would arise in these ballistic systems. It would be possible to lengthen the required stroke, but for these reasons these systems have not gained a foothold in practice.

By "ballistic" what is meant is that the movable valve closing element, on excitation of the magnet coil, makes an opening movement that is not limited by a stop, so that depending on the intensity of the electromagnetic excitation, the valve closing element is moved more or less in the opening direction of the valve and reverses its motion before reaching a stop, as a result of gravity and the force of the restoring spring. That is, similarly to a bullet, the movable valve element executes a motion similar to a ballistic curve.

If it is desired to adapt the introduced fuel quantity to the course of air quantity as shown in FIG. 1, then by comparison with previous injection systems, in which the valve may be opened virtually 100% at full load, the same quantities must be introduced within much shorter insufflation times. With gaseous fuels, considerably larger cross sections, at approximately the same pressures, must additionally be made available by comparison with liquid fuels. The kinetics of the known valves would be very critical then, especially since the damping and lubricating action of liquid fuels would not be available.

From diesel injection, systems are known in which the chronological metering is effected via a rotation in synchronism with the camshaft. A first diaphragm system on the jacket of a circular cylinder is rotated counter to a second diaphragm system. Once the first diaphragm system is located over the second one, at a suitable angular position of the camshaft, the valve is completely opened. In the usual diesel injection pumps, the quantity is defined via the pumping rate of the piston, so that the filling per stroke is the same. In the injection systems applicable here for Otto engines, however, a constant pressure difference over the diaphragm exists, and as a result the insufflated quantity per filling in these systems is inversely proportional to the rpm. To correct this behavior would require enormous effort.

OBJECT AND SUMMARY OF THE INVENTION

It is a principal object of the invention to provide a slide valve having the advantage over the prior art that because of the opening and closing of the valve "on the fly", a very steep chronological rise in the quantity at the onset o injection and a correspondingly steep drop at the end of injection takes place, and a valve motion in approximately the form of a cosine line as in FIG. 9 is produced, which is largely equivalent to the required chronological course of delivery of the quantity shown in FIG. 1. The control edges are overtaken very quickly, which is advantageous because the region of the control edges in practice is poorly defined, since the leakage at the gap has a poorly defined and also temperature-dependent influence. Also, the pneumatic forces at the opening site of the control edge vary particularly markedly, so that if overtaking were slow, the control value would include a particularly large error. In the known valves of this type, lifting from the stop is poorly controlled because of th strong forces of adhesion of a valve seat. These disadvantages can now no longer occur.

The portion of the metering motion that is shifted ahead is preferably substantially 30 to 50% of the metering motion, so that the control edges are overtaken particularly fast and the rise or drop over time is particularly great.

The slide valve may be embodied as a stroke adjuster valve, in which case the valve member is assigned a maximum linear stroke that limits the metering motion. The valve member is advantageously connected with an electromagnetic stroke adjuster, having a magnetic and/or electromagnetic restoring force for returning it to its position of repose. As a result, the restoring force already comes into play in the currentless state, to attain "safe" closure. However, it can also be dynamically reinforced by an inverse voltage or an inverse current.

It has proved particularly favorable to embody the slide valve as a rotary slide valve; then the valve member is assigned a maximum rotational angle that limits the metering motion. Preferably, the valve member is connected for this purpose with an electromagnetic rotary adjuster in the manner of a synchronous motor, which in particular has two electrically excitable magnet poles. As a result, by the operative magnetic force, a position of repose in the currentless state and an open position upon electrical excitation of the rotary adjuster are defined, with a shuttle motion taking place between these two positions. In principle, a mechanical limitation to the rotary angle is not required but it may nevertheless be provided in addition.

The valve member is suitably supported by means of roller bearings so that even gaseous fuels such as hydrogen can readily be used. Lubrication by liquid fuels is not needed.

The valve member disposed sealingly and rotatably in a cylinder bore has control recesses, by means of which, after the predetermined portion of the metering rotary motion, at least one inflow conduit discharging radially into the cylinder bore can be made to communicate with at least one axial conduit extending to an outlet opening of the valve. By optimizing the control recesses and the discharge point of the inflow conduits, the fuel metering can be optimized. Variability is provided by exchanging the valve member.

The axial conduit may extend beside the valve member in the valve housing and may be at least partly opened toward the cylinder bore. The control recesses are embodied as at least one groove, extending in the axial direction, on the circumference of the valve member. However, it is also possible for the axial conduit to extend in or on the valve member and in particular concentrically within it, and for the control recesses to be embodied as openings that effect communication between the axial conduit and the surface of the valve member.

Particularly exact fuel metering is obtained by providing a position sensor detecting the position of the valve member. A sensor coil array disposed in the valve housing and surrounding the valve member, or an extension of the valve member, suitably serves for this purpose. With this position sensor, regulation of the valve member motion and hence of the course of the quantity injected is possible. In this regulating circuit or control loop, the signal of the position sensor is used as an actual value, and predetermined characteristic curves are used as the set-point value. Compared with the known quantity shown in FIG. 3, position regulation providing characteristic curves in accordance with FIG. 1 and 9) has the following advantages:

1. Position regulation is possible even in the vicinity of the control edges, which is virtually impossible in a known valve seat.

2. The coulomb friction changes its algebraic sign (+or −) upon a change in direction of the motion. The resultant error in bearing fades with time and thus is proportional to the number of changes in direction in the metering region. It occurs once in FIG. 1 and three times in FIG. 3.

3. In normal operation the valve member does not strike a stop in its "on" position either, which is very important given the absence of damping and lubrication.

A clocked control voltage having two polarities advantageously serves as a control variable; by means of the clocking, in the ideal case the effective current can be regulated as a function of the desired characteristic curve (FIG. 9) without loss.

The invention will be better understood and further objects and advantages thereof will become more apparent from the ensuing detailed description of preferred embodiments take in conjunction with the drawings.

DESCRIPTION OF THE PREFERRED EMBODIMENT

Figure 1:
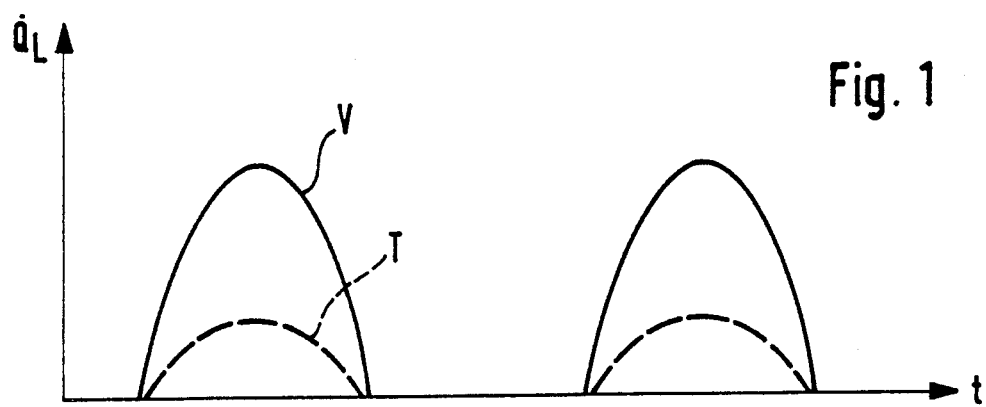
FIG. 1 shows a characteristic curve representing the quantity of air $A_L$ aspirated by an internal combustion engine as a function of the time t.
Figure 2:
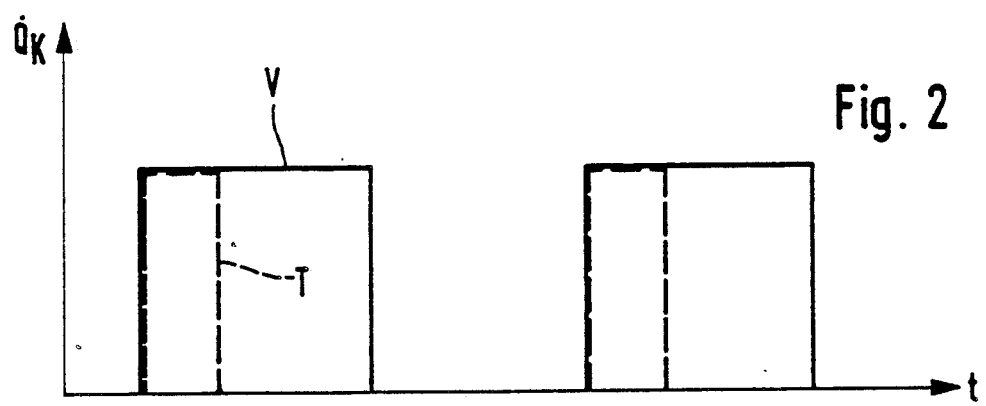
FIG. 2 is a corresponding characteristic curve for the quantity of fuel supplied in know injection valves having two stops.
Figure 3:
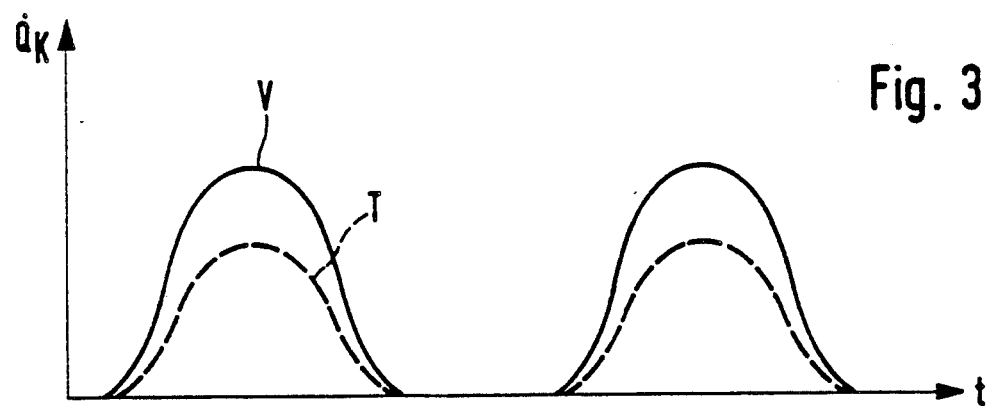
FIG. 3 is a corresponding characteristic curve for a known ballistic valve seat having one stop.

The characteristic curves shown in FIGS. 1-3 do not necessarily illustrate typical or actual conditions in terms of the signal interval, width, etc.; they serve merely to illustrate the respective curve course. The actual signal intervals are typically greater in relation to the signal width.

In the exemplary embodiment shown in FIGS. 4-7, a valve comprises a rotationally symmetrical valve housing 10, which has a central, axially extending cylindrical bore 11. In this bore, a valve member 12 and a magnetic rotor 14, connected to it via a shaft 13, are rotatably supported by means of two ball bearings 15, 16 located at the ends. Instead of ball bearings, other roller bearings may naturally be used. The element comprising the valve member 12 and rotor 14 is insertable into the bore 11 from the right; a specific shaping of the left-hand end region of the valve member 12 and valve housing 10 in the vicinity of the left end ball bearing 15 forms a stop. The bore 11 is sealingly closed off from the right-hand side by a screw closure 17, which carries a sealing ring 18 disposed in a circumferential groove. The right end ball bearing 16 is supported on the screw closure 17 via a spring element 19; this ball bearing 16 is in turn disposed on a tapered portion 20 of the shaft 13 and is braced against the shaft 13 in the lefthand direction. The left end region of the valve member, supported by the ball bearing 15, has regular rectangular recesses 22 on its terminal edge, which in the assembled state are engaged by narrower protrusions 23 on the circumferential region of the bore mouth, as a result of which a maximum adjusting angle is predetermined.

In the vicinity of the section line A-B, the valve housing 10 has a groove-like indentation 24 on its circumference; three radial stepped bores, embodied as inflow conduits 25 and offset from one another by 120° each, extend from the bore 11 as far as the bottom of this indentation 24. On its circumference, the valve member 12 likewise has three axially extending grooves 26 at regular intervals and a substantially semicircular cross section; toward the left side, the grooves are limited by means of a web 27 resting sealingly on the inside of the bore 11.

Figure 5:
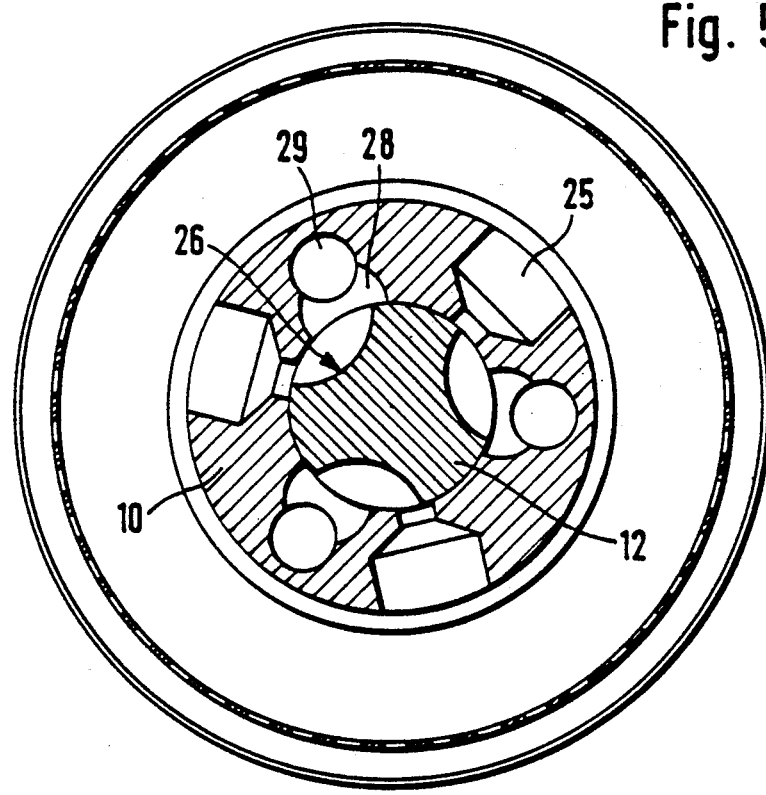
FIGS. 5 and 6, respectively, show a cross section taken along the line A-B in the opened and closed state of the valve in order to show the metering openings and conduits.
Figure 6:
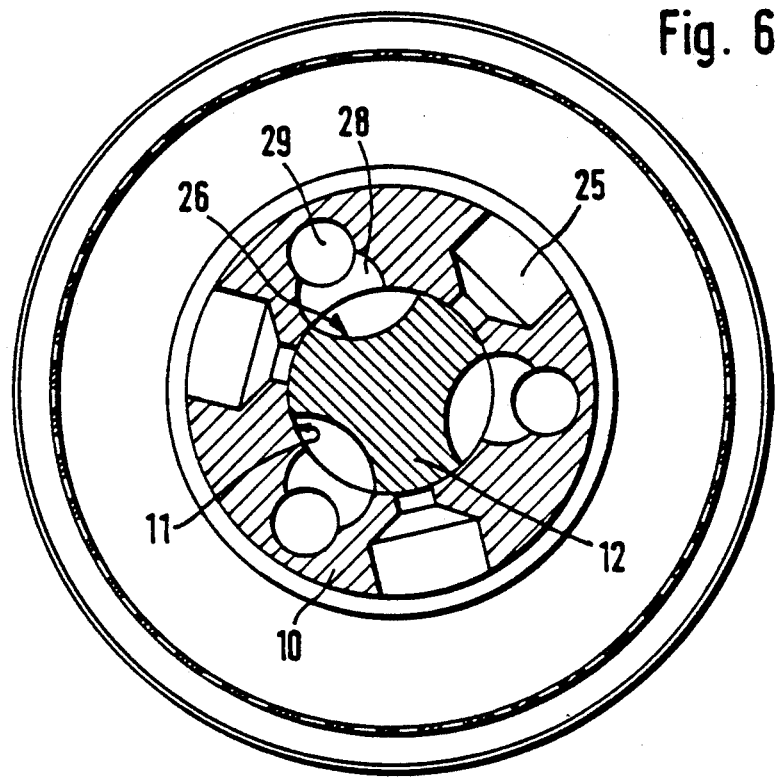

As shown in FIGS. 5 and 6, grooves 28 of substantially semicircular cross section are likewise formed in the bore 11 in the valve housing 10, extending in the axial direction in the region of the inflow conduits 25 and being disposed beside them. From the outer region of these grooves 28, three axial bores 29, as seen in FIGS. 5 and 6 which form outlet conduits, extend as far as the face end on the left.

FIG. 6 shows the valves in the electrically non-excited position of repose. The inflow conduits 25 are disconnected from the axial bores 29 by the valve member 12, so that no fuel can flow in. Upon electrical excitation of the valve, the valve member 12 begins to rotate counterclockwise; after a certain angle of this metering motion, the edges of the grooves 26 reach the next closest edges of the inner openings of the inflow conduits 25. Fuel can now flow through the inflow conduits 25, the grooves 26, the grooves 28 and the axial bores 29 of the valve. In FIG. 5, the virtually completely opened state of the valve is shown. As a function of the instant when the electrical excitation is switched off, or the instant of the reversal of voltage, a return motion to the position shown in FIG. 6 then takes place. This will be described in further detail below in conjunction with FIG. 9.

Figure 4:
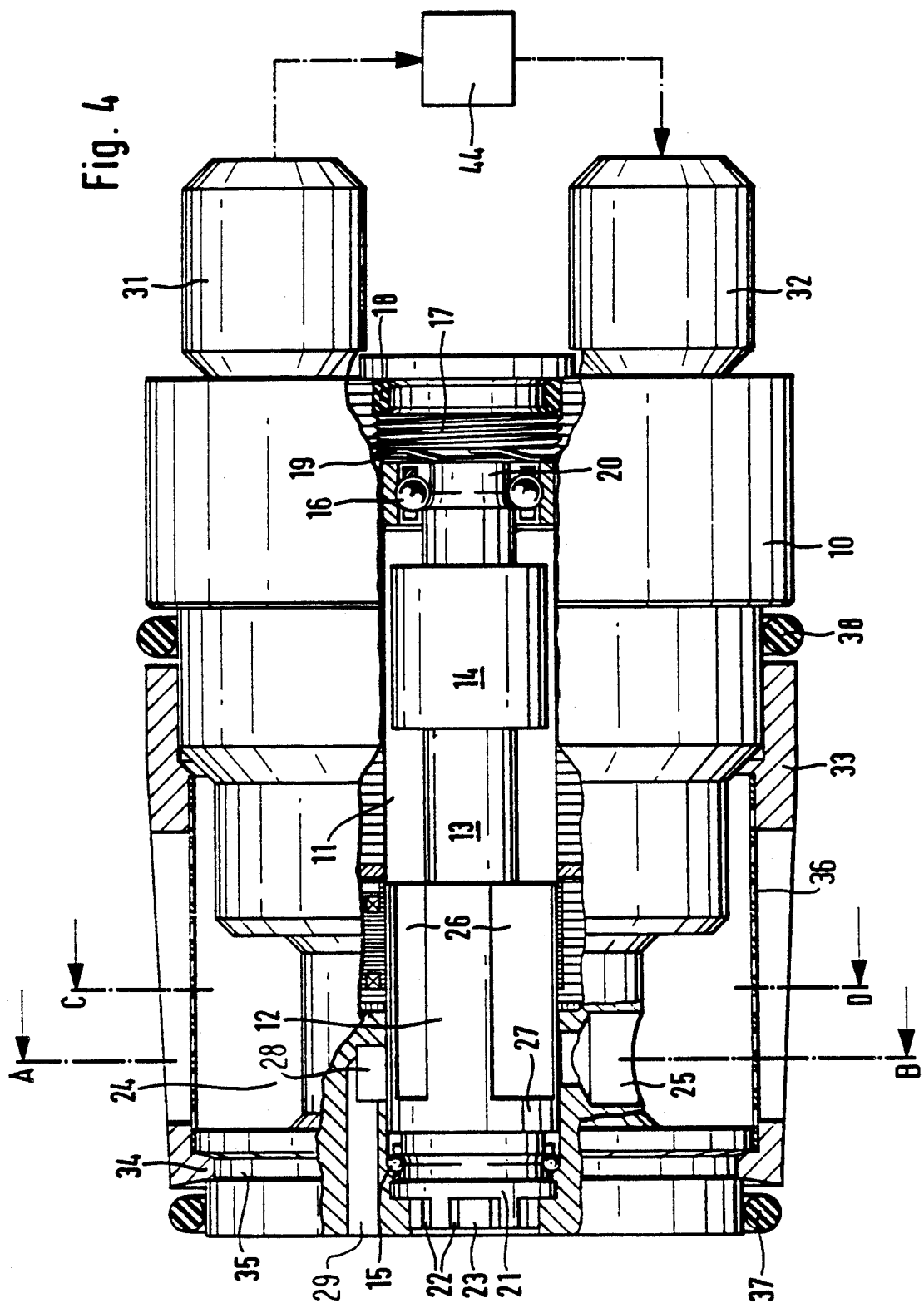
FIG. 4 is a side view of an injection valve, as an exemplary embodiment of the invention, in which the middle region, representing the valve member, and a slip-on element for supplying fuel are shown in section.
Figure 7:
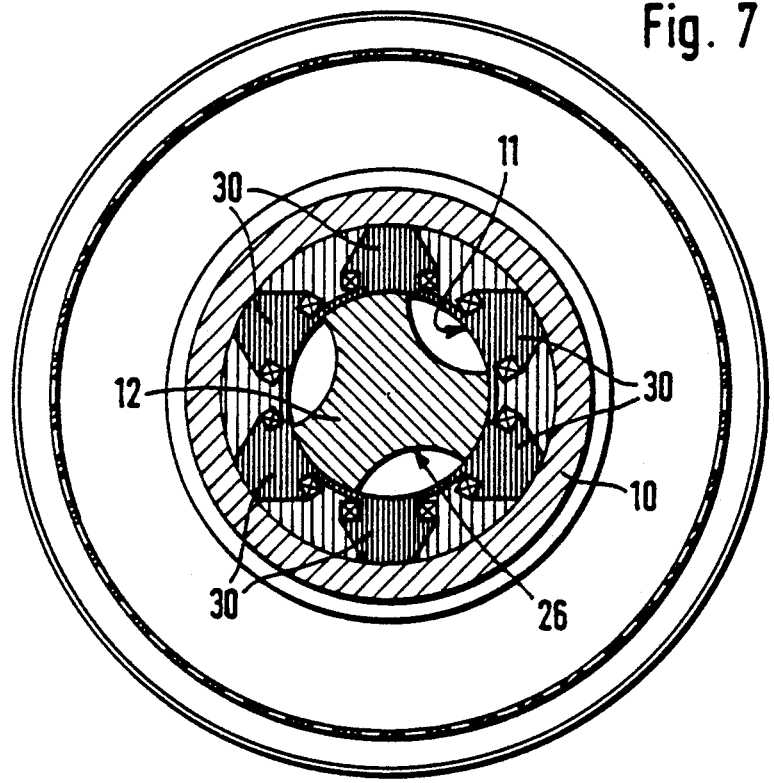
FIG. 7 is a cross section taken along the line C-D to show the position sensor.

The sectional view in FIG. 7 taken along the line C-D of FIG. 4 shows a position sensor for the valve member 12. Two series-connected three-pole sensor windings 30 are provided in the valve housing 10, around the bore 11. Because of the grooves 26, the valve member 12, which in this region is copper-lined, forms a sensor rotor at this point, which has two triple copper poles. As a function of the position of this rotor, high-frequency alternating voltage is damped at the sensor windings 30 as a function of the position of the valve member 12, in such a way that as the damping increases in one winding the damping decreases in the other. The two sensor windings 30 can be carried out of the valve housing either separately or with a common pole; this is done by means of an electrical plug device 31.

The magnetic rotor 14 disposed on the shaft 13, along with a magnetic winding, not visible in FIG. 4, in the valve housing 10, is embodied in the manner of a synchronous motor. The magnetic winding has two electrically excitable magnetic poles. Depending on the direction of the electrical current, a drive moment is generated in both directions of rotation, so that the magnetic rotor 14 and hence the valve member 12 swing back and forth. This kind of arrangement is also known as a torque motor. For supplying current to this winding, an electrical plug device 32 is used.

In FIG. 4, a filter tube 33 is slipped from the left onto the valve housing 10 and in this condition it covers the indentation 24. In this process, an interlocking of an inwardly protruding annular protrusion 34 of the terminal element 33 with a circumferential groove 35 on the valve housing 10 takes place. In its middle region, the filter tube 33 has openings 36 that allow the fuel to pass through. Ring seals 37, 38 rest on the valve housing 10 on both sides of the filter tube 33. The valve provided with the filter tube 33 can now be inserted into a holder, not shown, which in particular can be screwed into the intake tube of an internal combustion engine and this holder has lateral supply lines for the fuel that surround the valve in the form of annular conduits. The ring seals 37, 38 provide sealing with respect to the intake tube.

Figure 8:
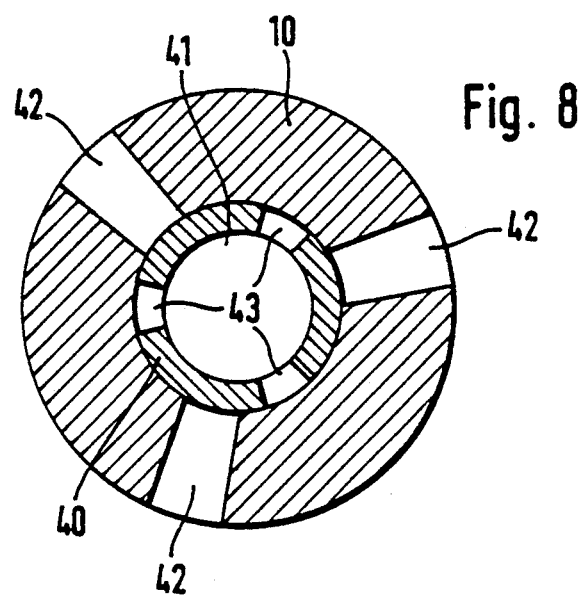
FIG. 8 shows a further version of the valve member in the valve housing.

FIG. 8 shows an alternative embodiment of the valve member in the corresponding region of section line A-B. A valve member 40 connected to the shaft 13 has a central bore 41 extending as far as the outlet-side end of the end of the valve; in the region of three radial inflow conduits 42 in the valve housing 10 this central bore can be made to communicate via control openings 43 with these inflow conduits 42. FIG. 8 shows the closed state of the valve. After a predetermined rotation of the valve member 40, the control openings 43 reach the position of the inflow conduits 42; as a result, fuel metering ensues Another alternative embodiment would comprise lengthening the grooves 26 of FIGS. 5 and 6 as far as the outlet side of the valve; as a result, the grooves 28 and axial bores 29 could then be omitted.

Figure 9:
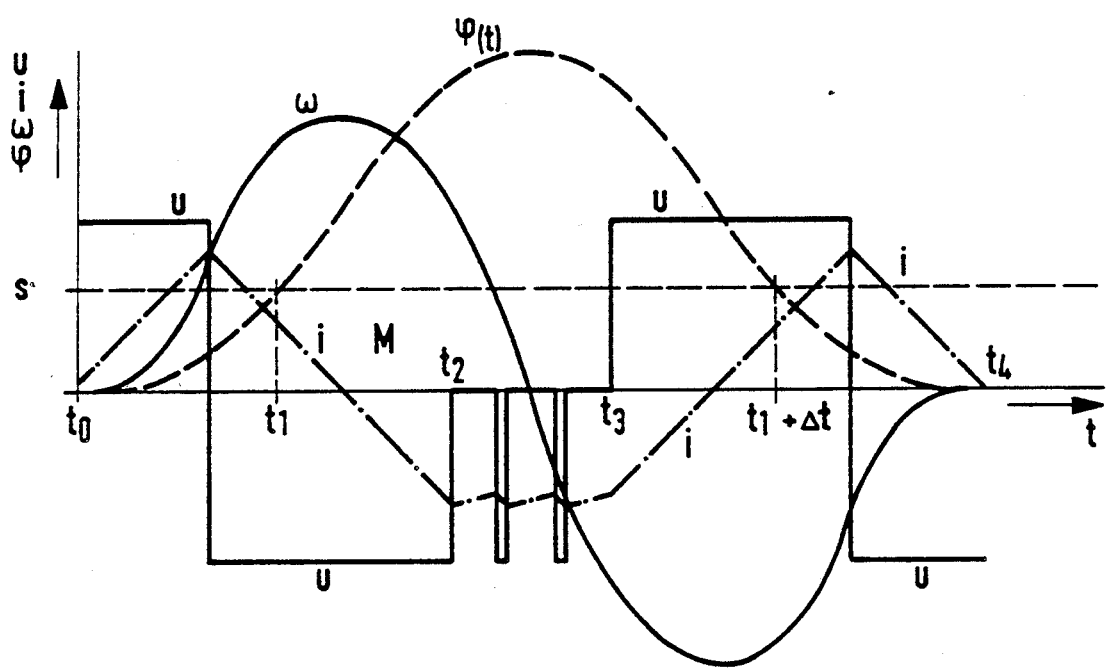
FIG. 9 is a diagram explaining the motion of the valve member as a function of the electrical voltage U and the electrical current I.

The diagram shown in FIG. 9 illustrates the relationships between the exciter voltage U and the exciter current I for exciting the magnetic winding for the magnetic rotor 14, the rotational speed omega and the rotational angle phi of the rotation of this rotor 14 or of the valve member 12 as a function of the time t. The curve representing the rotational angle phi is shown in dashed lines. A reversal line S marks the onset of opening and closing of the valve; that is, when the rotational angle phi intersects this reversal line S from below, the opening of the valve begins—in other words at time $t_1$. The solid angular line represents the voltage course U, and the dot-dash line shows the current course I.

At time $t_0$, the voltage U is switched on; the current I begins to rise, and the valve member 12 correspondingly varies its rotational angle faster and faster, in accordance with the rotational speed omega. The change in rotational angle is approximately proportional to $t^3$. At a predetermined instant, which in particular is regulated via the position sensor as a function of the rotational angle attained, the voltage U changes its polarity, and the current I drops.

At time $t_1$, the passage for the fuel is opened up, via the control edges formed by the grooves 28 and inflow conduits 25. Despite the decreasing current, which extends into the negative range, the rotational angle increases further proportionally to omega squared as a result of the rotational energy, and the insufflated quantity increases in proportion. Between times $t_2$ and $t_3$, the negative voltage U is clocked; the clocking takes place between the maximum value of the negative polarity and the zero value. The clocking is regulated in turn, as a result of which the valve member 12 does not come to a stop overly quickly and then reverse its direction of rotation. The longer clocking takes place, the more the insufflated fuel quantity increases. The current swings back and forth about a negative value in this process.

At time $t_3$, the voltage U changes its polarity again, and the current rises again, although it still takes a certain amount of time until it reaches the positive range once again. Because of the rotational energy, the valve member 12 nevertheless continues its return motion, and at time $t_1+$ delta t it reaches the reversal line S again; as a result further delivery of fuel is interrupted. Finally, the valve member 12, at time $t_4$, reaches its outermost return position, and the cycle begins over again. By means of this leading of the valve member 12 until the actual opening and trailing after the actual closing, the reversal line S is traversed very quickly, so that at the desired instant $t_1$, the valve opens very fast and introduces a large quantity of fuel in a defined manner. As a result, the characteristic curve approaches the ideal case shown in FIG. 1. Since both the reversal of the control voltage polarity and the clocking, which in principle takes place not only between $t_2$ and $t_3$, are regulated by the position sensor, a practically ideal adaptation of the actual value to the set-point value is possible. The characteristic curve shown is applicable to a final control element the moment of which is approximately proportional to the current I. This is also true for negative current. In other final control elements, this is not true for every case, so that in the individual case only a unipolar current might be appropriate. In that case, it is also possible to use an additional preliminary current.

It should also be noted that the valve according to the invention may also be provided with a linearly movable member, rather than a rotatable valve member. Instead of a rotary adjuster in the manner of a synchronous motor, an electromagnetic stroke adjuster is then used. In that kind of embodiment, it is still essential that an overtaking of the reversal line not occur until after a predetermined stroke of the valve member. In this embodiment as well, a position sensor is suitably provided to detect the linear motion of the valve member.

In FIG. 4, a regulating circuit 44 for the described valve is shown symbolically; via the plug device 31, this circuit is supplied with the sensor signals and via the plug device 32, this circuit delivers the control variable signals to the valve. Naturally this regulating circuit 4 may be part of a known fuel injection system or may be integrated into its control functions.

The foregoing relates to preferred exemplary embodiments of the invention, it being understood that other variants and embodiments thereof are possible within the spirit and scope of the invention, the latter being defined by the appended claims.

What is claimed and desired to be secured by letters patent of the U.S. is:

1. A valve for an intermittent introduction of a fuel quantity, in particular gaseous fuel, said fuel quantity increases and deceases successively as a function of time defining a first periodical course and is introduced into an intake tube of an internal combustion engine through which an aspirated air quantity flows and thereby increases and decreases successively as a function of the time defining a second periodical course, said valve having an electrically actuatable valve member disposed in a valve housing, in which said valve member is embodied as a rotary slide valve provided with a substantially cosine-like metering motion and said valve member is further provided with a metering conduit (25, 26, 28, 29, 42, 43, 41) adapted to open only after a predetermined portion of the metering motion is provided beyond a position of repose of the valve member (12; 40) which is assigned a maximum rotational angle that limits the metering motion, so that said first periodical course of said fuel quantity corresponds to said second periodical course of said aspirated air quantity.

2. The valve as defined by claim 1, in which the valve member (12, 40) is connected to an electromagnetic rotary adjuster (14) in the manner of a synchronous motor.

3. The valve as defined by claim 2, in which the rotary adjuster (14) includes two electrically excitable magnetic poles.

4. The valve as defined by claim 1, in which roller bearings are provided for bearing the valve member (12, 40).

5. The valve as defined by claim 2, in which roller bearings are provided for bearing the valve member (12, 40).

6. The valve as defined by claim 3, in which roller bearings are provided for bearing the valve member (12, 40).

7. The valve as defined by claim 1, in which the valve member (12, 40) is disposed sealingly and rotatably in a cylindrical bore (11) and is provided with control recesses ((26, 43), by means of which, after said predetermined portion of the rotary metering motion, at least one inflow conduit (25, 42) discharging radially into the cylinder bore (11) can be make to communicate with at least one axial conduit (29; 41) extending to an outlet opening of the valve.

8. The valve as defined by the claim 2, in which the valve member (12, 40) is disposed sealingly and rotatably in a cylindrical bore (11) and is provided with control recesses (26, 43) by means of which, after said predetermined portion of the rotary metering motion, at least one inflow conduit (25, 42) discharging radially into the cylinder bore (11) can be made to communicate with at least one axial conduit (29; 41) extending to an outlet opening of the valve.

9. The valve as defined by claim 3, in which the valve member (12, 40) is disposed sealingly and rotatably in a cylindrical bore (11) and is provided with control recesses (26, 43), by means of which, after said predetermined portion of the rotary metering motion, at least one inflow conduit (25, 42) discharging radially into the cylinder bore (11) can be made to communicate with at least one axial conduit (29; 41) extending to an outlet opening of the valve.

10. The valve as defined by claim 4, in which the valve member (12, 40) is disposed sealingly and rotatably in a cylindrical bore (11) and is provided with control recesses (26, 43), by means of which, after said predetermined portion of the rotary metering motion, at least one inflow conduit (25, 42) discharging radially into the cylinder bore (11) can be made to communicate with at least one axial conduit (29; 41) extending to an outlet opening of the valve.

11. The valve as defined by claim 1, in which the conduit (29) extends axially in the valve housing (10) beside the valve member (12) and is at least partly open toward the bore (11).

12. The valve as defined by claim 11, in which the control recesses (26) comprise grooves extending in the axial direction on the circumference of the valve member (12).

13. The valve as defined by claim 7, in which the axial conduit (41) extends in or on the valve member (40).

14. The valve as defined by claim 7, in which the axial conduit (41) extends on the valve member (40).

15. The valve as defined by claim 13, in which the axial conduit (41) extends concentrically in the valve member (40), and the control recesses (43) comprise openings effecting communication between the axial conduit (41) and the surface of the valve member (40).

16. The valve as defined by claim 1, in which means are provided for shutting off and/or reversing the control current to controlling the valve member (12; 40) into its open and closed position.

17. The valve as defined in claim 1, in which a position sensor (30) is provided for detecting the position of the valve member (12, 40).

18. The valve as defined by claim 17, in which a sensor coil array (30) is provided disposed in the valve housing so as to surround the valve member (12) or an extension of the valve member.

19. The valve as defined by claim 18, in which the sensor coil array (30) is disposed in the region of control recesses (26) or axial conduits in the surface of the valve member (12).

20. The valve as defined by claim 17, in which a regulating circuit is adapted to determine the metering motion and said signal from the position sensor (30) serves as an actual value and predetermined control characteristic curves serve as the set-point value.

21. The valve as defined by claim 20, in which said control variable comprises a voltage alternating between two polarities or changing to a zero value which is embodied in clockable fashion.

22. The valve as defined by claim 21, in which the clocking takes place between the voltage value of at least one of the two polarities and the zero value.

23. A valve for an intermittent introduction of a fuel quantity, in particular gaseous fuel said fuel quantity increases and decreases successively as a function of time defining a first periodical course and is introduced into an intake tube of an internal combustion engineer through which an aspirated air quantity flows and thereby increases and decreases successively as a function of the time defining a second periodical course, said valve having an electrically actuatable valve member disposed in a valve housing, in which said valve member is embodied as a rotary slide valve provided with a substantially cosine-like metering motion and said valve member is further provided with a metering conduit (25, 26, 28, 29, 42, 43, 41) adapted to open only after a predetermined portion of from 30 to 50 percent of the metering motion is provided beyond a position of repose of the valve member (12; 40) which is assigned a maximum rotational angel that limits the metering motion, so that said first periodical course of said fuel quantity corresponds to said second periodical course of said aspirated air quantity.

24. The valve as defined by claim 23, in which the valve member (12, 40) is connected to an electromagnetic rotary adjuster (14) in the manner of a synchronous motor.

25. The valve as defined by claim 24, in which the rotary adjuster (14) includes two electrically excitable magnetic poles.

* * * * *